(12) United States Patent
Xu

(10) Patent No.: US 12,107,799 B2
(45) Date of Patent: Oct. 1, 2024

(54) METHOD FOR CONFIGURING RESOURCE TRANSMISSION CANCELLATION INDICATION INFORMATION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Jing Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 388 days.

(21) Appl. No.: 17/453,295

(22) Filed: Nov. 2, 2021

(65) Prior Publication Data

US 2022/0060308 A1 Feb. 24, 2022

Related U.S. Application Data

(63) Continuation of application No. PCT/CN2020/084468, filed on Apr. 13, 2020.

(30) Foreign Application Priority Data

Oct. 24, 2019 (CN) .......................... 201911019515.5
Nov. 6, 2019 (CN) .......................... 201911076080.8
Nov. 13, 2019 (CN) .......................... 201911109297.4

(51) Int. Cl.
*H04L 5/00* (2006.01)
*H04L 27/26* (2006.01)

(52) U.S. Cl.
CPC ............ *H04L 5/0098* (2013.01); *H04L 5/001* (2013.01); *H04L 27/26025* (2021.01)

(58) Field of Classification Search
CPC ..... H04L 5/0098; H04L 5/001; H04L 5/0073; H04L 27/2602
See application file for complete search history.

(56) References Cited

U.S. PATENT DOCUMENTS 10,149,338 B2 12/2018 Basu Mallick et al.
10,568,142 B2  2/2020 Rong et al.
(Continued)

FOREIGN PATENT DOCUMENTS

CN 106507497 A 3/2017
CN 109787736 A 5/2019
(Continued)

OTHER PUBLICATIONS

Office Action of the Indian application No. 202117049353, issued on Jun. 6, 2022. 6 pages with English Translation.
(Continued)

*Primary Examiner* — Jamal Javaid
*Assistant Examiner* — Ryan C Kavleski
(74) *Attorney, Agent, or Firm* — Perkins Coie LLP

(57) ABSTRACT

A method for configuring resource transmission cancellation indication information, a terminal device, and a network device are provided. The method comprises: receiving configuration information from a network device, the configuration information being used to configure resource transmission cancellation indication information, and the configuration information comprising at least one of the following types of information: a first reference time domain range; a reference frequency domain range; a resource transmission cancellation indication bit count; a first time domain indication granularity; and information used for determining the origin offset of resource transmission cancellation indication information.

18 Claims, 9 Drawing Sheets

Case 1

Case 2

(56) References Cited

U.S. PATENT DOCUMENTS

| | | | |
|---|---|---|---|
| 2017/0303240 A1 | 10/2017 | Basu Mallick et al. | |
| 2018/0199381 A1 | 7/2018 | Rong et al. | |
| 2019/0223044 A1 | 7/2019 | Qin et al. | |
| 2019/0254006 A1 | 8/2019 | Basu Mallick et al. | |
| 2020/0267672 A1* | 8/2020 | Chien | H04W 56/0055 |
| 2020/0351897 A1* | 11/2020 | Fakoorian | H04W 72/0453 |
| 2021/0022134 A1* | 1/2021 | Chen | H04L 5/0078 |
| 2021/0152312 A1 | 5/2021 | Xiong et al. | |
| 2022/0140977 A1 | 5/2022 | Xiong et al. | |
| 2022/0330217 A1* | 10/2022 | Xiao | H04W 72/23 |

FOREIGN PATENT DOCUMENTS

| | | | | |
|---|---|---|---|---|
| CN | 110351834 | A | 10/2019 | |
| CN | 110366245 | A | 10/2019 | |
| CN | 110366246 | A | 10/2019 | |
| EP | 3198981 | A1 | 8/2017 | |
| EP | 3512281 | A1 | 7/2019 | |
| EP | 3780809 | A1 | 2/2021 | |
| WO | 2016045094 | A1 | 3/2016 | |
| WO | 2018127955 | A1 | 7/2018 | |
| WO | 2019032844 | A1 | 2/2019 | |
| WO | 2019184688 | A1 | 10/2019 | |
| WO | 2019191977 | A1 | 10/2019 | |
| WO | WO-2020168235 | A1 * | 8/2020 | H04L 1/1812 |

OTHER PUBLICATIONS

Supplementary European Search Report in the European application No. 20880152.2, mailed on May 20, 2022. 13 pages.

Vivo "UL inter-UE Tx prioritization for URLLC" R1-1906150; 3GPP TSG RAN WG1 #97; Reno, USA, May 13-17, 2019. 13 pages.

First Office Action of the European application No. 20880152.2, issued on Jan. 23, 2023. 6 pages.

First Office Action of the Chinese application No. 202110641836.X, issued on Apr. 15, 2022. 18 pages with English translation.

LG Electronics, "Discussion on UL inter UE Tx prioritization", 3GPP TSG RAN WG1 #98bis R1-1910830, Chongqing, China, Oct. 14-20, 2019. 8 pages.

Vivo, "Summary#2 of UL inter UE Tx prioritization/multiplexing", 3GPP TSG RAN WG1 #98bis R1-1911660, Chongqing, China, Oct. 14-20, 2019. 39 pages.

Vivo, "Summary#3 of UL inter UE Tx prioritization/multiplexing", 3GPP TSG RAN WG1 #98bis R1-1911688, Chongqing, China, Oct. 14-20, 2019. 39 pages.

Vivo, "Summary#4 of UL inter UE Tx prioritization/multiplexing", 3GPP TSG RAN WG1 #98bis R1-1911712, Chongqing, China, Oct. 14-20, 2019. 40 pages.

Written Opinion of the International Search Authority in the international application No. PCT/CN2020/084468, mailed on Jul. 6, 2020. 8 pages with English translation.

International Search Report in the international application No. PCT/CN2020/084468, mailed on Jul. 6, 2020.

ZTE, "UL inter-UE multiplexing between eMBB and URLLC", 3GPP TSG RAN WG1 #98bis R1-1910104, Chongqing, China, Oct. 14-20, 2019, the whole document. 13 pages.

Vivo, "UL inter-UE Tx prioritization for URLLC", 3GPP TSG RAN WG1 #98 R1-1908162, Prague, CZ, Aug. 26-30, 2019, the whole document. 14 pages.

First Office Action of the Japanese application No. 2021-576927, issued on Jan. 23, 2024. 8 pages with English translation.

Hearing Notice of the Indian application No. 202117049353, issued on Mar. 4, 2024. 3 pages with English translation.

* cited by examiner

METHOD FOR CONFIGURING RESOURCE TRANSMISSION CANCELLATION INDICATION INFORMATION, TERMINAL DEVICE AND NETWORK DEVICE

CROSS-REFERENCE TO RELATED APPLICATIONS

This is a continuation application of International Patent Application No. PCT/CN2020/084468 filed on Apr. 13, 2020, which claims priority to Chinese Patent Application No. 201911019515.5, filed on Oct. 24, 2019, Chinese Patent Application No. 201911076080.8, filed on Nov. 6, 2019 and Chinese Patent Application No. 201911109297.4, filed on Nov. 13, 2019, the contents of which are hereby incorporated by reference in their entireties.

TECHNICAL FIELD

The disclosure relates to the field of communication, and particularly to a method for configuring transmission resource cancelation indication information, a terminal device, and a network device.

RELATED ART

In a New Radio (NR) system, two services, i.e., Ultra-Reliable Low Latency Communication (URLLC) and Enhanced Mobile Broadband (eMBB), are introduced. URLLC has a characteristic of implementing ultra-reliable (for example, 99.999%) transmission in an extremely low latency (for example, 1 ms), and eMBB has a characteristic of insensitivity to a latency but support of a large number of transmissions. In a scenario where URLLC and eMBB coexist, for implementing real-time transmission of URLLC, when URLLC and eMBB transmissions conflict, URLLC and eMBB may interfere with each other, which influences demodulation performance of URLLC. Retransmission may reduce the influences but may prolong a transmission latency of URLLC.

A present solution to the problem of Uplink (UL) transmission conflicts of URLLC and eMBB is to stop eMBB transmission to reduce interferences to URLLC. For a multi-carrier condition, when signal transmission on a certain carrier is interrupted, transmission at the same time position on another carrier is also required to be interrupted. For example, in case of simultaneous transmission on Component Carrier 1 (CC1) and a CC2, if the same Subcarrier Spacing (SCS) is used for CC1 and CC2, a signal interruption condition is illustrated by case 1 in FIG. 1. If an SCS of CC1 is 15 kHZ, and an SCS of CC2 is 30 kHZ, a time length of each symbol of CC1 is twice a time length of each symbol of CC2, and the signal interruption condition is illustrated by case 2 and case 3 in FIG. 1.

The network side may notify an eMBB user of a resource occupation condition of a URLLC service through transmission resource cancelation indication information such that the eMBB user stops eMBB transmission to reduce interferences to URLLC. Therefore, how to configure the transmission resource cancelation indication information to simplify the signal interruption processing and improve efficiency of a communication system is a problem that needs to be solved at present.

SUMMARY

Embodiments of the disclosure provide a method for configuring transmission resource cancelation indication information, a terminal device, and a network device.

A first aspect provides a method for configuring transmission resource cancelation indication information, which may include the following operation.

Configuration information is received from a network device. The configuration information is configured to configure the transmission resource cancelation indication information, and the configuration information includes at least one of the following: a first reference time region, a reference frequency region, a transmission resource cancelation indication bit number, a first time indication granularity, or information used for determining a starting point offset of the transmission resource cancelation indication information.

A second aspect provides a method for configuring transmission resource cancelation indication information, which may include the following operation.

Configuration information is sent to a terminal device. The configuration information is configured to configure the transmission resource cancelation indication information, and the configuration information includes at least one of the following: a first reference time region, a reference frequency region, a transmission resource cancelation indication bit number, a first time indication granularity, or information used for determining a starting point offset of the transmission resource cancelation indication information.

A third aspect provides a terminal device, which is configured to execute the method in the first aspect or each implementation mode thereof. Specifically, the terminal device includes function modules configured to execute the method in the first aspect or each implementation mode thereof.

A fourth aspect provides a network device, which is configured to execute the method in the second aspect or each implementation mode thereof. Specifically, the network device includes function modules configured to execute the method in the second aspect or each implementation mode thereof.

A fifth aspect provides a terminal device, which may include a processor and a memory. The memory may be configured to store a computer program. The processor may be configured to call and run the computer program stored in the memory to execute the method in the first aspect or each implementation mode thereof.

A sixth aspect provides a network device, which may include a processor and a memory. The memory may be configured to store a computer program. The processor may be configured to call and run the computer program stored in the memory to execute the method in the second aspect or each implementation mode thereof.

A seventh aspect provides a chip, which may be configured to implement the method in any one of the first aspect to the second aspect or each implementation mode thereof. Specifically, the chip may include a processor, configured to call and run a computer program in a memory to enable a device installed with the chip to execute the method in any one of the first aspect to the second aspect or each implementation mode thereof.

An eighth aspect provides a computer-readable storage medium, which may be configured to store a computer program. The computer program enables a computer to execute the method in any one of the first aspect to the second aspect or each implementation mode thereof.

A ninth aspect provides a computer program product, which may include a computer program instruction. The computer program instruction enables a computer to execute the method in any one of the first aspect to the second aspect or each implementation mode thereof.

A tenth aspect provides a computer program. The computer program may run in a computer to enable the computer to execute the method in any one of the first aspect to the second aspect or each implementation mode thereof.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5th-Generation (5G) system.

Figure 1:
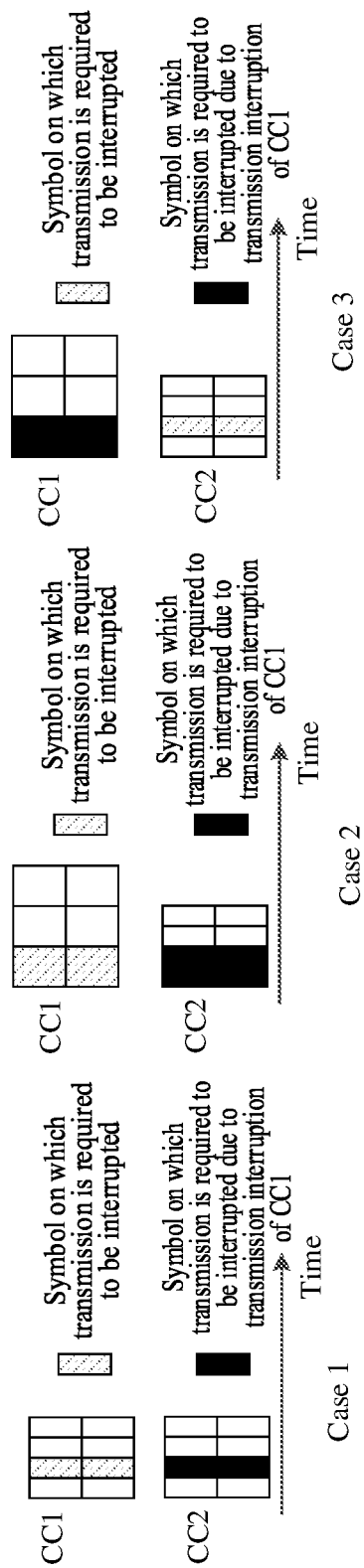
FIG. 1 is a schematic diagram of signal transmission interruption according to the related art.
Figure 2:
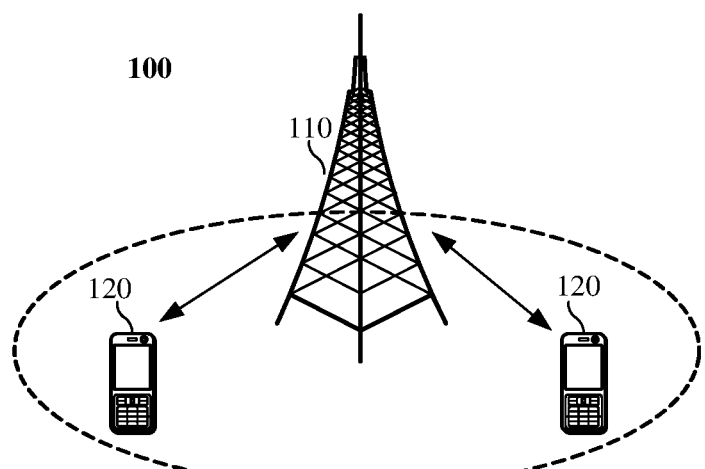
FIG. 2 is a schematic diagram of a communication system to which the embodiments of the disclosure are applied.

Exemplarily, FIG. 2 illustrates a communication system 100 to which the embodiments of the disclosure are applied. The communication system 100 may include a network device 110. The network device 110 may be a device communicating with a terminal device 120 (or called a communication terminal and a terminal). The network device 110 may provide communication coverage for a specific geographical region and communicate with a terminal device located in the coverage. In one example, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Alternatively, the network device may be a mobile switching center, a relay station, an access point, a vehicle-mounted device, a wearable device, a hub, a switch, a network bridge, a router, a network-side device in a 5G network, a network device in a future evolved Public Land Mobile Network (PLMN), or the like.

The communication system 100 further includes at least one terminal device 120 within the coverage of the network device 110. As used herein, the "terminal device" includes, but is not limited to, the connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as a Digital Video Broadcasting-Handheld (DVB-H) network, a satellite network, an AM-FM broadcast transmitter; and/or means of another terminal device arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G system or the 5G network may also be called an NR system or an NR network.

FIG. 2 exemplarily illustrates one network device and two terminal devices. In one example, the communication system 100 may include multiple network devices, and another number of terminal devices may be included in coverage of each network device. No limits are made thereto in the embodiments of the disclosure.

In one example, the communication system 100 may further include another network entity such as a network controller and a mobility management entity. No limits are made thereto in the embodiments of the disclosure.

It is to be understood that a device with a communication function in the network/system in the embodiments of the present disclosure may be referred to as a communication device. Taking the communication system 100 illustrated in FIG. 2 as an example, the communication device may include the network device 110 and the terminal device 120 with the communication function. The network device 110 and the terminal device 120 may be specific devices mentioned above, and details are not described herein. The communication device may also include other devices in the communication system 100, for example, other network entity such as a network controller or a mobility management entity, which is not limited in the embodiments of the present disclosure.

It is to be understood that terms "system" and "network" in the disclosure may usually be interchanged in the disclosure. In the disclosure, the term "and/or" is only an association relationship describing associated objects and represents that three relationships may exist. For example, A and/or B may represent three conditions: i.e., independent existence of A, existence of both A and B, and independent existence of B. In addition, character "I" in the disclosure usually represents that previous and next associated objects form an "or" relationship.

There are two services, URLLC and eMBB, in an NR system. URLLC has a characteristic of implementing ultra-reliable (for example, 99.999%) transmission in an extremely low latency (for example, 1 ms), and eMBB has a characteristic of insensitivity to a latency but support of a large number of transmissions. In a scenario where URLLC and eMBB coexist, for implementing real-time transmission of URLLC, when URLLC and eMBB transmissions conflict, URLLC and eMBB may interfere with each other, which influences the demodulation performance of URLLC. Retransmission may reduce the influences but may prolong a transmission latency of URLLC.

A present solution to the problem of UL transmission conflicts of URLLC and eMBB is to stop eMBB transmission to reduce interferences to URLLC. The network side may notify an eMBB user of a resource occupation condition of a URLLC service through transmission resource cancelation indication information such that the eMBB user stops eMBB transmission to reduce interferences to URLLC.

Figure 3:
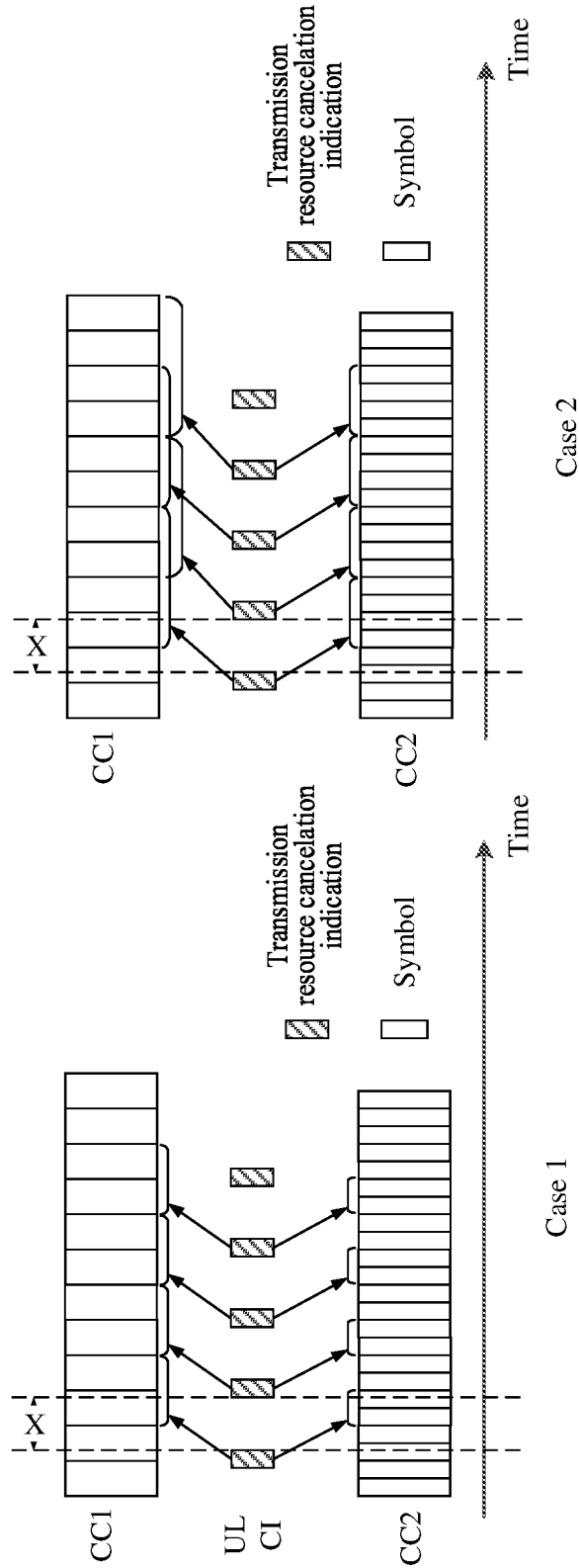
FIG. 3 illustrates a method for configuring transmission resource cancelation indication information according to the related art.

In the related art, a reference time region of the transmission resource cancelation indication information (for example, Uplink Cancelation Indication (UL CI) or Uplink Cancelation Information (UL CI)) is configurable, and during configuration, symbol is taken as a unit. For example, in case of simultaneous transmission on CC1 and CC2, if the same SCS is used for CC1 and CC2, a signal interruption condition is illustrated by case 1 in FIG. 3. If an SCS of CC1 is 15 kHz, and an SCS of CC2 is 30 kHz, a time length of each symbol of CC1 is twice a time length of each symbol of CC2. If a configured reference time region is 2symbol, an indication result is illustrated by case 1 in FIG. 3, and some symbols of CC2 cannot be covered by the reference time region. If the configured reference time region is 4symbol, the indication result is illustrated by case 2 in FIG. 3, and some symbols of CC1 are repeatedly indicated.

Based on the related art, a problem required to be solved at present is how to configure the transmission resource cancelation indication information to simplify a signal interruption processing and improve the efficiency of a communication system.

Therefore, the embodiments of the disclosure provide a method for configuring transmission resource cancelation indication information. Configuration information of the transmission resource cancelation indication information includes at least one of a reference time region, a reference frequency region, a transmission resource cancelation indication bit number, a time indication granularity, or information used for determining a starting point offset of the transmission resource cancelation indication information. Therefore, under a multi-carrier condition, when transmission resource cancelation indication information is configured for each carrier, reference time positions and time indication granularities of the same time length are used to further simplify a signal interruption processing under the multi-carrier condition and improve the system efficiency.

Figure 4:
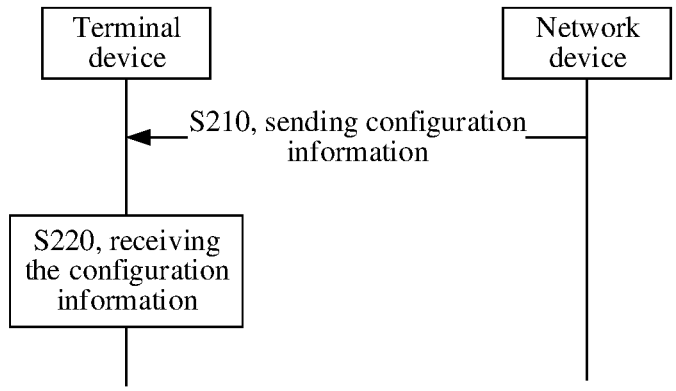
FIG. 4 is a schematic diagram of a method for configuring transmission resource cancelation indication information according to an embodiment of the disclosure.

FIG. 4 is a schematic flowchart of a method 200 for configuring transmission resource cancelation indication information according to an embodiment of the disclosure. The method 200 may be executed by a terminal device and a network device. For example, the terminal device may be the terminal device illustrated in FIG. 2, and the network device may be the network device illustrated in FIG. 2.

As illustrated in FIG. 4, the method 200 includes the following operation. In S210, configuration information is sent, i.e., the network device sends the configuration information to the terminal device. The configuration information is used for configuring transmission resource cancelation indication information, and the configuration information includes at least one of the following: a first reference time region, a reference frequency region, a transmission resource cancelation indication bit number, a first time indication granularity, or information used for determining a starting point offset of the transmission resource cancelation indication information.

As illustrated in FIG. 4, the method 200 further includes the following operation. In S220, the configuration information is received, i.e., the terminal device receives the configuration information from the network device. The configuration information is used for configuring the transmission resource cancelation indication information, and the configuration information includes at least one of the following: the first reference time region, the reference frequency region, the transmission resource cancelation indication bit number, the first time indication granularity, or the information used for determining the starting point offset of the transmission resource cancelation indication information.

It is to be understood that, after the terminal device receives the configuration information from the network device, the terminal device may parse the transmission resource cancelation indication information based on the configuration information to obtain a resource position where transmission is canceled.

It is to be noted that, if there is no information used for determining the starting point offset of the transmission resource cancelation indication information in the configuration information, the terminal device may determine the starting point offset of the transmission resource cancelation indication information based on the terminal capability.

In some embodiments, a starting point of the first reference time region may be defined based on the following manners.

First manner: if a UE detects transmission resource cancelation indication information (UL CI) in a Physical Downlink Control Channel (PDCCH) transmitted in a Control Resource Set (CORESET) in a slot, reference time region starts from $X \cdot 2^{\mu-\mu_{RTR}}$ symbols after the ending symbol of the PDCCH CORESET carrying the UL CI, where X is configured by the value of Preemption-to-reference time region timing, $\mu$ is the SCS configuration for a serving cell with mapping to a respective field in the UL CI, $\mu_{RTR}$ is the SCS configuration of the UL Bandwidth Part (BWP) where the UE receives the PDCCH with UL CI.

Second manner: if a UE detects a UL CI in a PDCCH transmitted in a CORESET in a slot, reference time region starts from X symbols after the ending symbol of the PDCCH CORESET carrying the UL CI, where X is configured by the value of Preemption-to-reference time region timing for serving cell with mapping to a respective field in the UL CI.

In some embodiments, a time length corresponding to the first reference time region may be defined based on the following manners.

First manner: the duration of reference time region is T, where T is configured by the value of reference time region duration for serving cell with mapping to a respective field in the UL CI.

Second manner: the duration of reference time region is $T_{RTR} \cdot 2^{\mu-\mu_{RTR}}$, where $T_{RTR}$ is configured by the value of reference time region duration, $\mu$ is the SCS configuration for a serving cell with mapping to a respective field in the UL CI, $\mu_{RTR}$ is the SCS configuration of the UL BWP where the UE receives the PDCCH with UL CI.

As an example, the first reference time region is independently configured for different carriers. Alternatively, it can be understood that the first reference time region may be independently configured for each carrier. It is assumed that reference time regions are required to be configured for two carriers (CC1 and CC2), an SCS corresponding to CC1 is 15 kHz, a time length corresponding to each symbol is t1, an SCS corresponding to CC2 is 30 kHz, and a time length corresponding to each symbol is t2, t1=t2*2.

Figure 5:
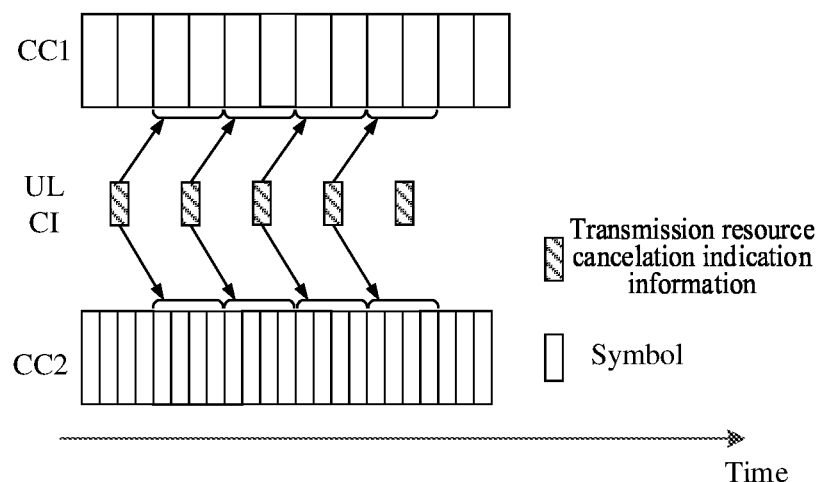
FIG. 5 is a schematic diagram of a method for configuring transmission resource cancelation indication information according to a specific embodiment of the disclosure.

As illustrated in FIG. 5, if the time length corresponding to the reference time region required to be configured is T5=2*t1, since the time length corresponding to each symbol of CC1 is t1, and 2 symbols are required to reach T5, the configured reference time region is 2symbol; and since the time length corresponding to each symbol of CC2 is t2, and 4 symbols are required to reach T5, the configured reference time region is 4symbol.

Figure 6:
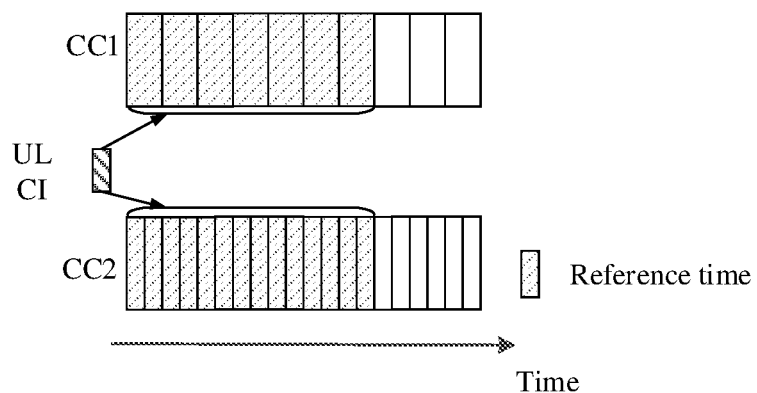
FIG. 6 is a schematic diagram of a method for configuring transmission resource cancelation indication information according to another specific embodiment of the disclosure.

Alternatively, as illustrated in FIG. 6, if the time length corresponding to the reference time region required to be configured is T5=7*t1, since the time length corresponding to each symbol of CC1 is t1, and 7 symbols are required to reach T5, the configured reference time region is 7symbol; and since the time length corresponding to each symbol of CC2 is t2, and 14 symbols are required to reach T5, the configured reference time region is 14symbol.

Figure 7:
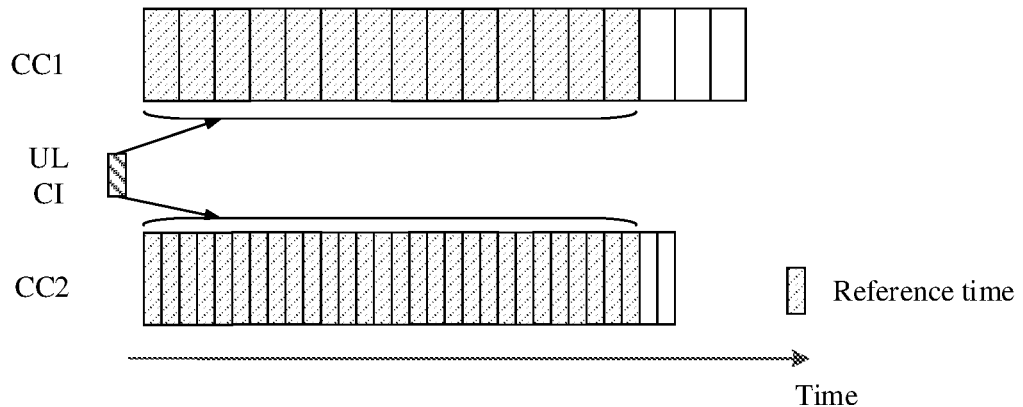
FIG. 7 is a schematic diagram of a method for configuring transmission resource cancelation indication information according to another specific embodiment of the disclosure.

Alternatively, as illustrated in FIG. 7, if the time length corresponding to the reference time region required to be configured is T6=14*t1, since the time length corresponding to each symbol of CC1 is t1, and 14 symbols are required to reach T6, the configured reference time region is 14symbol; and since the time length corresponding to each symbol of CC2 is t2, and 28 symbols are required to reach T6, the configured reference time region is 28symbol.

As another example, the reference time region of each carrier is determined based on an SCS of each carrier and the first reference time region, and the first reference time region corresponds to a first SCS. The first SCS is configured by the network device, or the first SCS is predetermined in a protocol. When the first SCS is configured by the network device, the configuration information further includes the first SCS.

Figure 8:
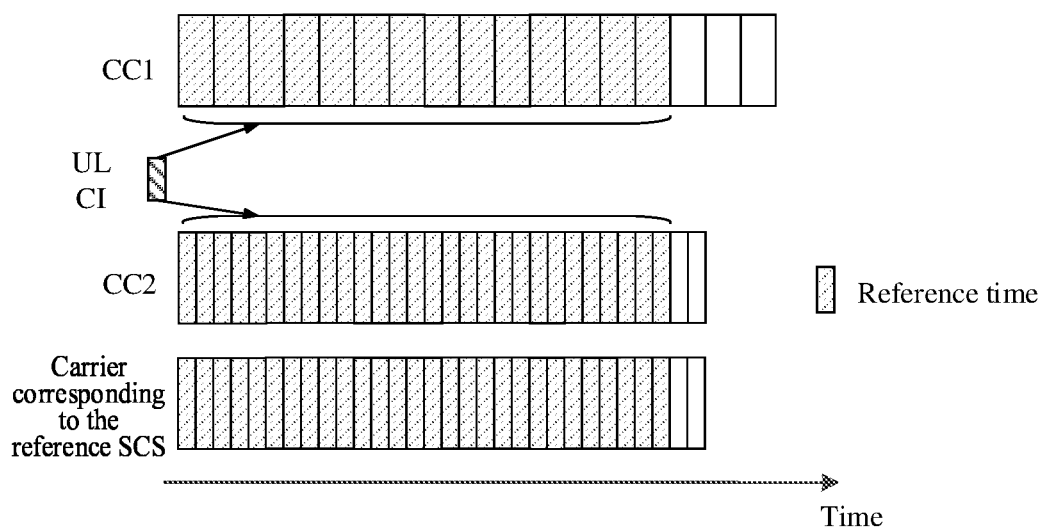
FIG. 8 is a schematic diagram of a method for configuring transmission resource cancelation indication information according to another specific embodiment of the disclosure.

For example, as illustrated in FIG. 8, it is assumed that reference time regions are required to be configured for two carriers (CC1 and CC2), an SCS corresponding to CC1 is 15 kHz, a time length corresponding to each symbol is t1, an SCS corresponding to CC2 is 30 kHz, and a time length corresponding to each symbol is t2, t1=t2*2. It is configured by a network or predetermined in the protocol that the reference SCS is 30 kHz (the same as the SCS corresponding to CC2), and the time length corresponding to each symbol is t2. If a time length corresponding to the first reference time region is T7=14*t1, since the reference SCS is 30 kHz, the time length corresponding to each symbol is t2, and 28 symbols are required to reach T7, the reference time region required to be configured for CC1 is 28symbol, and the reference time region required to be configured for CC2 is 28symbol.

Based on the above embodiment, the first SCS is an SCS of a carrier carrying the transmission resource cancelation indication information; or, the first SCS is a minimum SCS in SCSs of multiple carriers; or, the first SCS is a maximum SCS in the SCSs of the multiple carriers; or, the first SCS is a reference SCS used when a Slot Format Indication (SFI) is configured; or, the first SCS is a minimum SCS in SCSs corresponding to Frequency Range 1 (FR1); or, the first SCS is a maximum SCS in the SCSs corresponding to FR1; or, the first SCS is a minimum SCS in SCSs corresponding to FR2; or, the first SCS is a maximum SCS in the SCSs corresponding to FR2; or, the first SCS is an SCS indicated in physical signaling.

The first SCS is a downlink SCS. Alternatively, the first SCS is a UL SCS.

As a specific example, a value of the first reference time region includes one of the following: 1 symbol, 2 symbols, 4 symbols, 7 symbols, 14 symbols, 21 symbols, 28 symbols, 35 symbols, or 42 symbols.

As a specific example, the value of the first reference time region is $M*2^n$ symbols, n being a nonnegative integer, and M being a positive integer. Considering a relationship between symbol lengths of different SCSs is $2^n$, n being a serial number difference of the SCSs, for ensuring that the same time length may be configured for reference time regions of carriers using different SCSs, $M*2^n$ symbols are introduced. Typically, M=1, 2, 4, 7, and n=0, 1, 2. Therefore, the value of the first reference time region also includes one of the following: 1*2", 2*2", 4*2", or 7*2". In some embodiments, the time length corresponding to the first reference time region is more than or equal to a period of a search space carrying the transmission resource cancelation indication information.

In some embodiments, reference time regions of different carriers correspond to the same time length.

As another example, the first time indication granularity is independently configured for different carriers. Alternatively, the first time indication granularity may be independently configured for each carrier. In one example, a time length corresponding to the first time indication granularity is less than or equal to the time length corresponding to the first reference time region.

Figure 9:
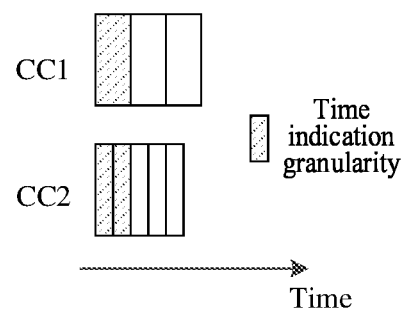
FIG. 9 is a schematic diagram of a method for configuring transmission resource cancelation indication information according to another specific embodiment of the disclosure.

For example, as illustrated in FIG. 9, it is assumed that time indication granularities are required to be configured for two carriers (CC1 and CC2), an SCS corresponding to CC1 is 15 kHz, a time length corresponding to each symbol is t1, an SCS corresponding to CC2 is 30 kHz, and a corresponding time length is t2, t1=t2*2. If the time length corresponding to the first time indication granularity required to be configured is T1=t1, since the time length corresponding to each symbol of CC1 is t1, and 1 symbol is required to reach T1, the configured time indication granularity is 1 symbol; and since the time length corresponding to each symbol of CC2 is t2, and 2 symbols are required to reach T1, the configured time indication granularity is 2symbol.

Figure 10:
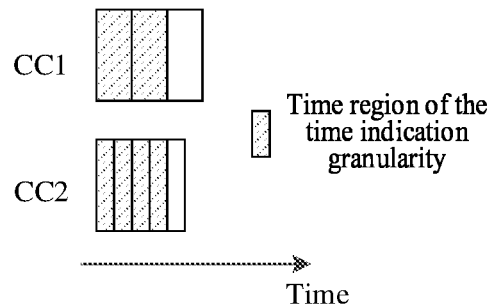
FIG. 10 is a schematic diagram of a method for configuring transmission resource cancelation indication information according to another specific embodiment of the disclosure.

Alternatively, as illustrated in FIG. 10, if the time length corresponding to the first time indication granularity required to be configured is T2=2*t1, since the time length corresponding to each symbol of CC1 is t1, and 2 symbol is required to reach T2, the configured time indication granularity is 2symbol; and since the time length corresponding to each symbol of CC2 is t2, and 4 symbols are required to reach T2, the configured time indication granularity is 4symbol.

As another example, the time indication granularity of each carrier is determined based on an SCS of each carrier and the first time indication granularity, and the first time granularity corresponds to a second SCS. The second SCS is configured by the network device, or the second SCS is predetermined in the protocol. When the second SCS is configured by the network device, the configuration information further includes the second SCS.

In one example, the second SCS is an SCS of the carrier carrying the transmission resource cancelation indication information; or, the second SCS is a minimum SCS in SCSs of multiple carriers; or, the second SCS is a maximum SCS in the SCSs of the multiple carriers; or, the second SCS is a reference SCS used when an SFI is configured; or, the second SCS is the minimum SCS in the SCSs corresponding to FR1; or, the second SCS is the maximum SCS in the SCSs corresponding to FR1; or, the second SCS is the minimum SCS in the SCSs corresponding to FR2; or, the second SCS is the maximum SCS in the SCSs corresponding to FR2; or, the second SCS is an SCS indicated in the physical signaling.

In the embodiment of the disclosure, the second SCS is a downlink SCS. Alternatively, the second SCS is a UL SCS.

Figure 11:
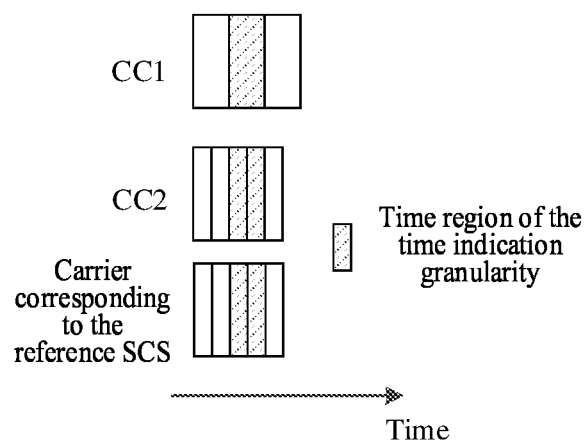
FIG. 11 is a schematic diagram of a method for configuring transmission resource cancelation indication information according to another specific embodiment of the disclosure.

For example, as illustrated in FIG. 11, it is assumed that time indication granularities are required to be configured for two carriers (CC1 and CC2), an SCS corresponding to CC1 is 15 kHz, a time length corresponding to each symbol is t1, an SCS corresponding to CC2 is 30 kHz, and a time length corresponding to each symbol is t2, t1=t2*2. It is configured by a network or predetermined in the protocol that the reference SCS is 30 kHz, and a time length corresponding to each symbol is t2. If the time length corresponding to the first time indication granularity required to be configured is T3=t1, since the reference SCS is 30 kHz, the time length corresponding to each symbol is t2, and 2 symbol is required to reach T3, the time indication granularity required to be configured for CC1 is 2symbol, and the time indication granularity required to be configured for CC2 is 2symbol.

It is assumed that time indication granularities are required to be configured for two carriers (CC1 and CC2), an SCS corresponding to CC1 is 15 kHz, a time length corresponding to each symbol is t1, an SCS corresponding to CC2 is 30 kHz, and a time length corresponding to each symbol is t2, t1=t2*2. The reference SCS is an SCS of 30 kHz used when the transmission resource cancelation indication information is transmitted, and a time length corresponding to each symbol is t2. If the time length corresponding to the first time indication granularity required to be configured is T3=t1, since the reference SCS is 30 kHz, the time length corresponding to each symbol is t2, and 2 symbols are required to reach T3, the time indication granularity required to be configured for CC1 is 2symbol, and the time indication granularity required to be configured for CC2 is 2symbol. A downlink SCS is used as the reference SCS, but the transmission resource cancelation indication information is configured to indicate a UL transmission resource. Indication of the time indication granularity through the reference downlink SCS may ensure that the indicated time resource range is matched with a period of the indication information, thereby avoiding missing coverage or repeated coverage.

Figure 12:
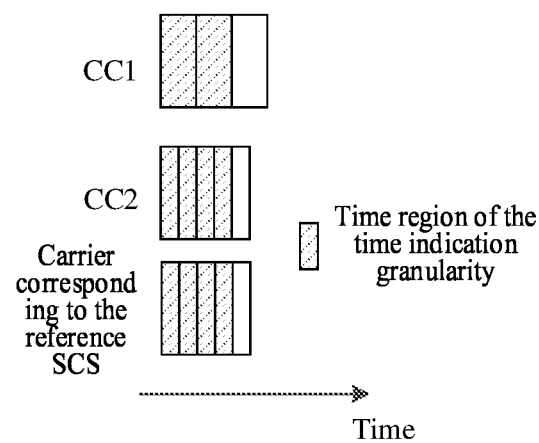
FIG. 12 is a schematic diagram of a method for configuring transmission resource cancelation indication information according to another specific embodiment of the disclosure.

Alternatively, as illustrated in FIG. 12, time granularities of different carriers correspond to the same time length. If the time length corresponding to the first time indication granularity required to be configured is T4=2*t1, since the reference SCS is 30 kHz, the time length corresponding to each symbol is t2, and 4 symbols are required to reach T4, the time indication granularity required to be configured for CC1 is 4symbol, and the time indication granularity required to be configured for CC2 is 4symbol.

As an example, the starting point of the first reference time region is determined based on transmission ending time of the transmission resource cancelation indication information and the starting point offset of the transmission resource cancelation indication information. Alternatively, it is understood that the starting point offset (X) of the transmission resource cancelation indication information is a time interval between the transmission ending time of the transmission resource cancelation indication information and the time starting point of the first reference time region.

Configuration methods for the starting point offset of the transmission resource cancelation indication information will be described below with specific examples. It is assumed that time indication granularities are required to be configured for two carriers (CC1 and CC2), an SCS corresponding to CC1 is 15 kHz, a time length corresponding to each symbol is t1, an SCS corresponding to CC2 is 30 kHz, and a time length corresponding to each symbol is t2, t1=t2*2.

Figure 13:
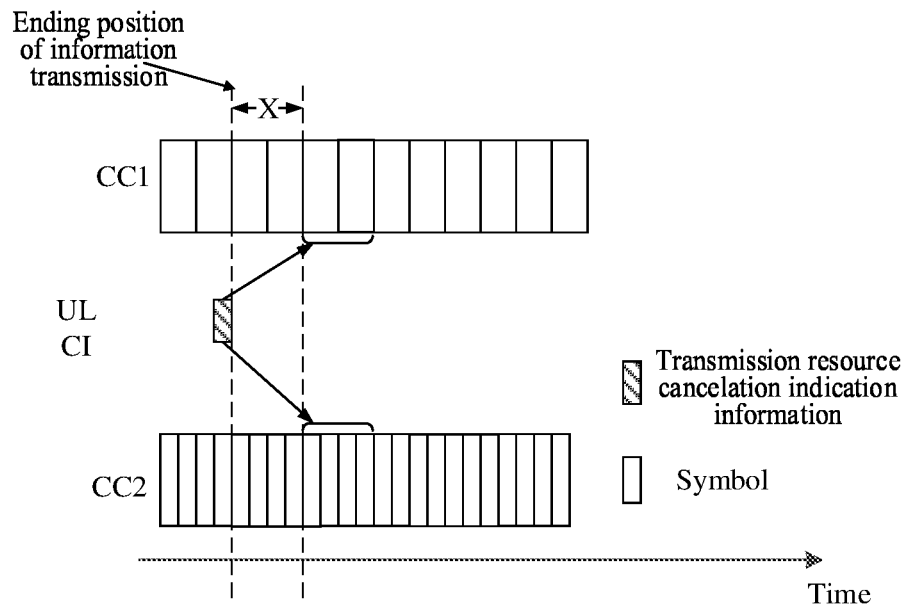
FIG. 13 is a schematic diagram of a method for configuring transmission resource cancelation indication information according to another specific embodiment of the disclosure.

First configuration method: as illustrated in FIG. 13, if a time length corresponding to the starting point offset of the transmission resource cancelation indication information is T8=2*t1, since the time length corresponding to each symbol of CC1 is t1, and 2 symbols are required to reach T8, the configured starting point offset of the transmission resource cancelation indication information is 2symbol; and since the time length corresponding to each symbol of CC2 is t2, and 4 symbols are required to reach T8, the configured starting point offset of the transmission resource cancelation indication information is 4symbol.

Second configuration method: it is configured or predetermined in the protocol that the reference SCS is 30 kHz, and the time length corresponding to each symbol is t2. If the time length corresponding to the starting point offset of the transmission resource cancelation indication information is T8=2*t1, since the reference SCS is 30 kHz, the time length corresponding to each symbol is t2, and 4 symbols are required to reach T8, the starting point offset of the transmission resource cancelation indication information required to be configured for CC1 is 2symbol, and the starting point offset of the transmission resource cancelation indication information required to be configured for CC2 is 4symbol.

As an example, the starting point of the first reference time region is determined based on a last symbol of a CORESET where the transmission resource cancelation indication information is located and the starting point offset of the transmission resource cancelation indication information. Alternatively, it is understood that the starting point offset of the transmission resource cancelation indication information is a time interval between the last symbol of the CORESET where the transmission resource cancelation indication information is located and the time starting point of the first reference time region.

The methods for configuring the information used for determining the starting point offset of the transmission resource cancelation indication information will be described below with specific examples. It is assumed that time indication granularities are required to be configured for two carriers (CC1 and CC2), an SCS corresponding to CC1 is 15 kHz, a time length corresponding to each symbol is t1, an SCS corresponding to CC2 is 30 kHz, and a time length corresponding to each symbol is t2, t1=t2*2.

Figure 14:
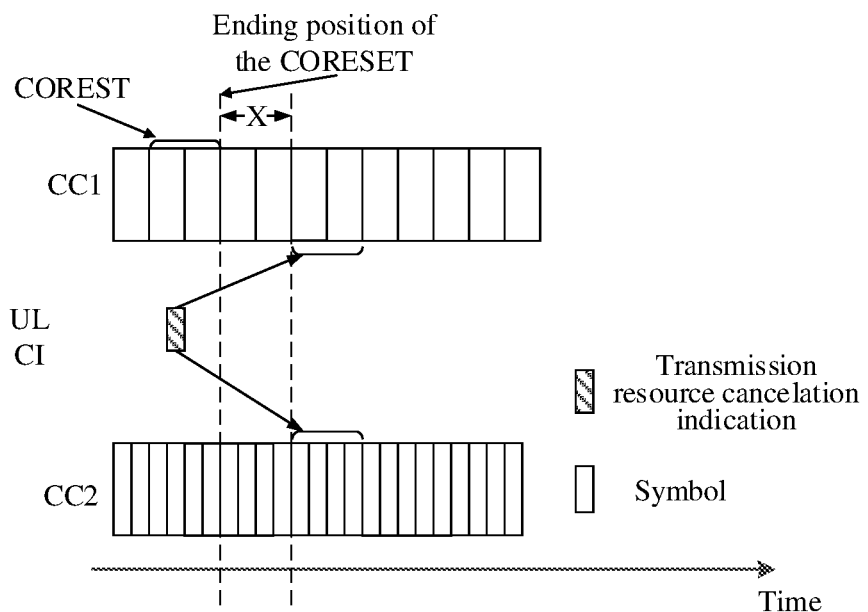
FIG. 14 is a schematic diagram of a method for configuring transmission resource cancelation indication information according to another specific embodiment of the disclosure.

First configuration method: as illustrated in FIG. 14, if a time length corresponding to the information used for determining the starting point offset of the transmission resource cancelation indication information is T8=2*t1, since the time length corresponding to each symbol of CC1 is t1, and 2 symbols are required to reach T8, the configured information used for determining the starting point offset of the transmission resource cancelation indication information is 2symbol; and since the time length corresponding to each symbol of CC2 is t2, and 4 symbols are required to reach T8, the configured information used for determining the starting point offset of the transmission resource cancelation indication information is 4symbol.

Second configuration method: it is configured or predetermined in the protocol that the reference SCS is 30 kHz, and the time length corresponding to each symbol is t2. If the time length corresponding to the information used for determining the starting point offset of the transmission resource cancelation indication information is T8=2*t1, since reference SCS is 30 kHz, the time length corresponding to each symbol is t2, and 4 symbols are required to reach T8, the information configured for CC1 to determine the starting point offset of the transmission resource cancelation indication information is 2symbol, and the information configured for CC2 to determine the starting point offset of the transmission resource cancelation indication information is 4symbol.

Based on the above embodiments, the information used for determining the starting point offset of the transmission resource cancelation indication information is independently configured for different carriers. Alternatively, the information used for determining the starting point offset of the transmission resource cancelation indication information is predetermined in the protocol. For example, the information used for determining the starting point offset of the transmission resource cancelation indication information is related to time N2 during which the terminal processes a UL shared data channel, or the information used for determining the starting point offset of the transmission resource cancelation indication information is related to Tproc,2. Tproc,2 is a minimum interval between a starting symbol of a Physical Uplink Shared Channel (PUSCH) and an ending position of a UL grant, a specific definition of which refers to 38.214. When Tproc,2 is used to determine the starting point offset of the transmission resource cancelation indication information, $d_{2,1}=0$.

In some embodiments, information configured for each carrier to determine a starting point offset of the transmission resource cancelation indication information is determined based on an SCS of each carrier and the information used for determining the starting point offset of the transmission resource cancelation indication information, and the information used for determining the starting point offset of the transmission resource cancelation indication information corresponds to a third SCS.

In some embodiments, the third SCS is configured by the network device, or the third SCS is predetermined in the protocol.

In some embodiments, the configuration information further includes third SCS information.

In some embodiments, the third SCS is an SCS of the carrier carrying the transmission resource cancelation indication information; or, the third SCS is a minimum SCS in SCSs of multiple carriers; or, the third SCS is a maximum SCS in the SCSs of the multiple carriers; or, the third SCS is a reference SCS used when the SFI is configured; or, the third SCS is a minimum SCS in the SCSs corresponding to FR1; or, the third SCS is a maximum SCS in the SCSs corresponding to FR1; or, the third SCS is a minimum SCS in the SCSs corresponding to FR2; or, the third SCS is a maximum SCS in the SCSs corresponding to FR2; or, the third SCS is an SCS indicated in the physical signaling.

In the embodiment of the disclosure, the third SCS is a downlink SCS. Alternatively, the third SCS is a UL SCS.

In some embodiments, the time length corresponding to the information used for determining the starting point offset of the transmission resource cancelation indication information is less than or equal to a period of the search space where the transmission resource cancelation indication information is located.

In some embodiments, information configured for different carriers to determine a starting point offset of the transmission resource cancelation indication information corresponds to the same time length.

It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure.

The method for configuring transmission resource cancelation indication information according to the embodiments of the disclosure is described above in combination with FIG. 1 to FIG. 14 in detail, and a terminal device and network device according to the embodiments of the disclosure will be described below in combination with FIG. 15 to FIG. 19.

Figure 15:
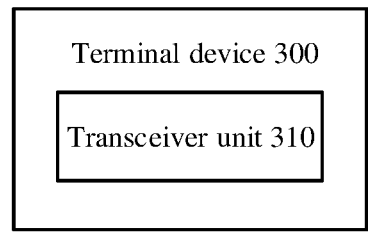
FIG. 15 is a schematic block diagram of a terminal device according to an embodiment of the disclosure.

As illustrated in FIG. 15, the terminal device 300 according to an embodiment of the disclosure includes a transceiver unit 310.

Specifically, the transceiver unit 310 is configured to receive configuration information from a network device. The configuration information is configured to configure transmission resource cancelation indication information, and the configuration information including at least one of the following: a first reference time region, a reference frequency region, a transmission resource cancelation indication bit number, a first time indication granularity, or information used for determining a starting point offset of the transmission resource cancelation indication information.

As an embodiment, the first reference time region is independently configured for different carriers.

As an embodiment, a reference time region of each carrier is determined based on an SCS of each carrier and the first reference time region, and the first reference time region corresponds to a first SCS.

As an embodiment, the first SCS is configured by the network device, or the first SCS is predetermined in a protocol.

As an embodiment, the configuration information further includes the first SCS.

As an embodiment, the first SCS is an SCS of a carrier carrying the transmission resource cancelation indication information; or, the first SCS is a minimum SCS in SCSs of multiple carriers; or, the first SCS is a maximum SCS in the SCSs of the multiple carriers; or, the first SCS is a reference SCS used when an SFI is configured; or, the first SCS is a minimum SCS in SCSs corresponding to FR1; or, the first SCS is a maximum SCS in the SCSs corresponding to FR1; or, the first SCS is a minimum SCS in SCSs corresponding to FR2; or, the first SCS is a maximum SCS in the SCSs corresponding to FR2; or, the first SCS is an SCS indicated in physical signaling.

As an embodiment, the first SCS is a downlink SCS; or, the first SCS is a UL SCS.

As an embodiment, a value of the first reference time region includes one of the following: 1 symbol, 2 symbols, 4 symbols, 7 symbols, 14 symbols, 21 symbols, 28 symbols, 35 symbols, or 42 symbols.

As an embodiment, the value of the first reference time region is $M*2^n$ symbols. n is a nonnegative integer, and M is a positive integer.

As an embodiment, a time length corresponding to the first reference time region is more than or equal to a period of a search space where the transmission resource cancelation indication information is located.

As an embodiment, reference time regions of different carriers correspond to the same time length.

As an embodiment, the first time indication granularity is independently configured for different carriers.

As an embodiment, a time indication granularity of each carrier is determined based on an SCS of each carrier and the first time indication granularity, and the first time granularity corresponds to a second SCS.

As an embodiment, the second SCS is configured by the network device, or the second SCS is predetermined in a protocol.

As an embodiment, the configuration information further includes the second SCS.

As an embodiment, the second SCS is an SCS of the carrier carrying the transmission resource cancelation indication information; or, the second SCS is a minimum SCS in SCSs of multiple carriers; or, the second SCS is a maximum SCS in the SCSs of multiple carriers; or, the second SCS is a reference SCS used when the SFI is configured; or, the second SCS is a minimum SCS in SCSs corresponding to FR1; or, the second SCS is a maximum SCS in the SCSs corresponding to FR1; or, the second SCS is a minimum SCS in SCSs corresponding to FR2; or, the second SCS is a maximum SCS in the SCSs corresponding to FR2; or, the second SCS is an SCS indicated in the physical signaling.

As an embodiment, the second SCS is a downlink SCS; or, the second SCS is a UL SCS.

As an embodiment, a value of the first time indication granularity includes one of the following: 1 symbol, 2 symbols, 4 symbols, 7 symbols, 14 symbols, 21 symbols, 28 symbols, 35 symbols, or 42 symbols.

As an embodiment, a time length corresponding to the first time indication granularity is less than or equal to the time length corresponding to the first reference time region.

As an embodiment, time granularities of different carriers correspond to the same time length.

As an embodiment, a starting point of the first reference time region is determined based on transmission ending time of the transmission resource cancelation indication information and the starting point offset of the transmission resource cancelation indication information; or, the starting point of the first reference time region is determined based on a last symbol of a CORESET where the transmission resource cancelation indication information is located and the starting point offset of the transmission resource cancelation indication information.

As an embodiment, the information used for determining the starting point offset of the transmission resource cancelation indication information is independently configured for different carriers.

As an embodiment, the information used for determining the starting point offset of the transmission resource cancelation indication information is predetermined in a protocol.

As an embodiment, information configured for each carrier to determine a starting point offset of the transmission resource cancelation indication information is determined based on an SCS of each carrier and the information used for determining the starting point offset of the transmission resource cancelation indication information, and the information used for determining the starting point offset of the transmission resource cancelation indication information corresponds to a third SCS.

As an embodiment, the third SCS is configured by the network device, or the third SCS is predetermined in a protocol.

As an embodiment, the configuration information further includes third SCS information.

As an embodiment, the third SCS is an SCS of the carrier carrying the transmission resource cancelation indication information; or, the third SCS is a minimum SCS in SCSs of multiple carriers; or, the third SCS is a maximum SCS in the SCSs of multiple carriers; or, the third SCS is a reference SCS used when the SFI is configured; or, the third SCS is a minimum SCS in SCSs corresponding to FR1; or, the third SCS is a maximum SCS in the SCSs corresponding to FR1; or, the third SCS is a minimum SCS in SCSs corresponding to FR2; or, the third SCS is a maximum SCS in the SCSs corresponding to FR2; or, the third SCS is an SCS indicated in the physical signaling.

As an embodiment, the third SCS is a downlink SCS; or, the third SCS is a UL SCS.

As an embodiment, a time length corresponding to the information used for determining the starting point offset of the transmission resource cancelation indication information is less than or equal to a period of the search space where the transmission resource cancelation indication information is located.

As an embodiment, information configured for different carriers to determine starting point offset of the transmission resource cancelation indication informations corresponds to the same time length.

It is to be understood that the above and other operations and/or functions of each unit in the terminal device 300 according to the embodiment of the disclosure are used to implement the corresponding flows executed by the terminal device in each method in FIG. 1 to FIG. 14 respectively and, for simplicity, will not be elaborated herein.

Figure 16:
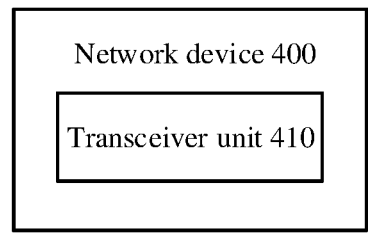
FIG. 16 is a schematic block diagram of a network device according to an embodiment of the disclosure.

As illustrated in FIG. 16, the network device 400 according to an embodiment of the disclosure includes a transceiver unit 410.

Specifically, the transceiver unit 410 is configured to send configuration information to a terminal device. The configuration information is configured to configure transmission resource cancelation indication information, and the configuration information includes at least one of the following: a first reference time region, a reference frequency region, a transmission resource cancelation indication bit number, a first time indication granularity, or information used for determining a starting point offset of the transmission resource cancelation indication information.

As an embodiment, the first reference time region is independently configured for different carriers.

As an embodiment, a reference time region of each carrier is determined based on an SCS of each carrier and the first reference time region, and the first reference time region corresponds to a first SCS.

As an embodiment, the first SCS is configured by the network device, or the first SCS is predetermined in a protocol.

As an embodiment, the configuration information further includes the first SCS.

As an embodiment, the first SCS is an SCS of a carrier carrying the transmission resource cancelation indication information; or, the first SCS is a minimum SCS in SCSs of multiple carriers; or, the first SCS is a maximum SCS in the SCSs of the multiple carriers; or, the first SCS is a reference SCS used when an SFI is configured; or, the first SCS is a minimum SCS in SCSs corresponding to FR1; or, the first SCS is a maximum SCS in the SCSs corresponding to FR1; or, the first SCS is a minimum SCS in SCSs corresponding to FR2; or, the first SCS is a maximum SCS in the SCSs corresponding to FR2; or, the first SCS is an SCS indicated in physical signaling.

As an embodiment, the first SCS is a downlink SCS; or, the first SCS is a UL SCS.

As an embodiment, a value of the first reference time region includes one of the following: 1 symbol, 2 symbols, 4 symbols, 7 symbols, 14 symbols, 21 symbols, 28 symbols, 35 symbols, or 42 symbols.

As an embodiment, the value of the first reference time region is $M*2^n$ symbols. n is a nonnegative integer, and M is a positive integer.

As an embodiment, a time length corresponding to the first reference time region is more than or equal to a period of a search space where the transmission resource cancelation indication information is located.

As an embodiment, reference time regions of different carriers correspond to the same time length.

As an embodiment, the first time indication granularity is independently configured for different carriers.

As an embodiment, a time indication granularity of each carrier is determined based on an SCS of each carrier and the first time indication granularity, and the first time granularity corresponds to a second SCS.

As an embodiment, the second SCS is configured by the network device, or the second SCS is predetermined in a protocol.

As an embodiment, the configuration information further includes the second SCS.

As an embodiment, the second SCS is an SCS of the carrier carrying the transmission resource cancelation indication information; or, the second SCS is a minimum SCS in SCSs of multiple carriers; or, the second SCS is a maximum SCS in the SCSs of multiple carriers; or, the second SCS is a reference SCS used when the SFI is configured; or, the second SCS is a minimum SCS in SCSs corresponding to FR1; or, the second SCS is a maximum SCS in the SCSs corresponding to FR1; or, the second SCS is a minimum SCS in SCSs corresponding to FR2; or, the second SCS is a maximum SCS in the SCSs corresponding to FR2; or, the second SCS is an SCS indicated in the physical signaling.

As an embodiment, the second SCS is a downlink SCS; or, the second SCS is a UL SCS.

As an embodiment, a value of the first time indication granularity includes one of the following: 1 symbol, 2 symbols, 4 symbols, 7 symbols, 14 symbols, 21 symbols, 28 symbols, 35 symbols, or 42 symbols.

As an embodiment, a time length corresponding to the first time indication granularity is less than or equal to the time length corresponding to the first reference time region.

As an embodiment, time granularities of different carriers correspond to the same time length.

As an embodiment, a starting point of the first reference time region is determined based on transmission ending time of the transmission resource cancelation indication information and the starting point offset of the transmission resource cancelation indication information; or, the starting point of the first reference time region is determined based on a last symbol of a CORESET where the transmission resource cancelation indication information is located and the starting point offset of the transmission resource cancelation indication information.

As an embodiment, the information used for determining the starting point offset of the transmission resource cancelation indication information is independently configured for different carriers.

As an embodiment, the information used for determining the starting point offset of the transmission resource cancelation indication information is predetermined in a protocol.

As an embodiment, information configured for each carrier to determine a starting point offset of the transmission resource cancelation indication information is determined based on an SCS of each carrier and the information used for determining the starting point offset of the transmission resource cancelation indication information, and the information used for determining the starting point offset of the transmission resource cancelation indication information corresponds to a third SCS.

As an embodiment, the third SCS is configured by the network device, or the third SCS is predetermined in a protocol.

As an embodiment, the configuration information further includes third SCS information.

As an embodiment, the third SCS is an SCS of the carrier carrying the transmission resource cancelation indication information; or, the third SCS is a minimum SCS in SCSs of multiple carriers; or, the third SCS is a maximum SCS in the SCSs of multiple carriers; or, the third SCS is a reference SCS used when the SFI is configured; or, the third SCS is a minimum SCS in the SCSs corresponding to FR1; or, the third SCS is a maximum SCS in the SCSs corresponding to FR1; or, the third SCS is a minimum SCS in the SCSs corresponding to FR2; or, the third SCS is a maximum SCS in the SCSs corresponding to FR2; or, the third SCS is an SCS indicated in the physical signaling.

As an embodiment, the third SCS is a downlink SCS; or, the third SCS is a UL SCS.

As an embodiment, a time length corresponding to the information used for determining the starting point offset of the transmission resource cancelation indication information is less than or equal to a period of the search space where the transmission resource cancelation indication information is located.

As an embodiment, information configured for different carriers to determine a starting point offset of the transmission resource cancelation indication information corresponds to the same time length.

Figure 17:
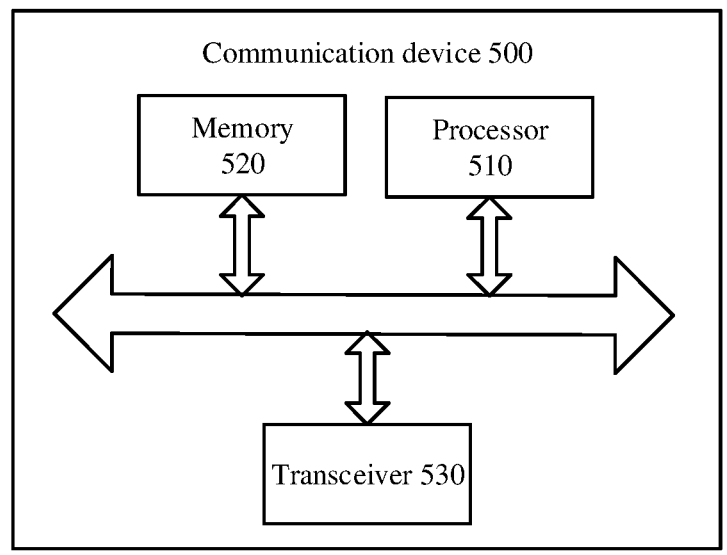
FIG. 17 is a schematic block diagram of a communication device according to an embodiment of the disclosure.

FIG. 17 is a schematic structure diagram of a communication device 500 according to an embodiment of the disclosure. The communication device 500 illustrated in FIG. 17 includes a processor 510, and the processor 510 may call and run a computer program in a memory to implement the method in the embodiments of the disclosure.

In one example, as illustrated in FIG. 17, the communication device 500 may further include a memory 520. The processor 510 may call and run the computer program in the memory 520 to implement the method in the embodiments of the disclosure.

The memory 520 may be a separate device independent of the processor 510 and may also be integrated into the processor 510.

In one example, as illustrated in FIG. 17, the communication device 500 may further include a transceiver 530. The processor 510 may control the transceiver 530 to communicate with other devices, specifically, to send information or data to the other device or receiving information or data sent by the other device.

The transceiver 530 may include a transmitter and a receiver. The transceiver 530 may further include an antenna (s), the number of which may be one or more.

In one example, the communication device 500 may specifically be the network device of the embodiments of the disclosure, and the communication device 500 may implement corresponding flows implemented by the network device in each method of the embodiments of the disclosure, which will not be elaborated herein for simplicity.

In one example, the communication device 500 may specifically be the mobile terminal/terminal device of the embodiments of the disclosure, and the communication device 500 may implement corresponding flows implemented by the mobile terminal/terminal device in each method of the embodiments of the disclosure, which will not be elaborated herein for simplicity.

Figure 18:
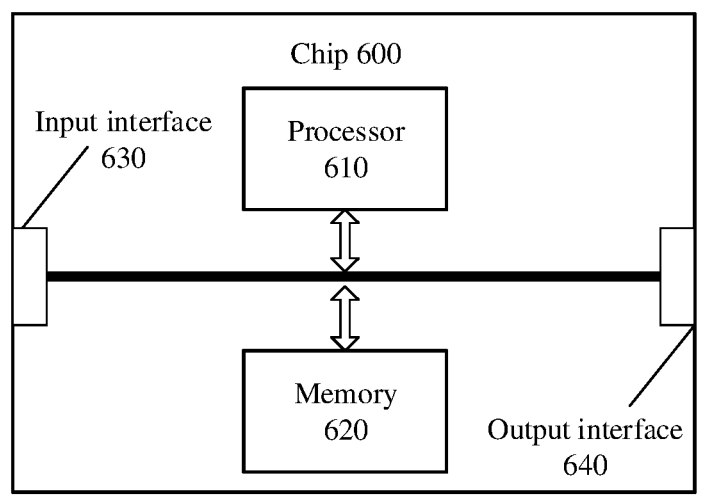
FIG. 18 is a schematic block diagram of a chip according to an embodiment of the disclosure.

FIG. 18 is a schematic structure diagram of a chip according to an embodiment of the disclosure. The chip 600 illustrated in FIG. 18 includes a processor 610. The processor 610 may call and run a computer program in a memory to implement the method in the embodiments of the disclosure.

In one example, as illustrated in FIG. 18, the chip 600 may further include a memory 620. The processor 610 may call and run a computer program in the memory 620 to implement the method in the embodiments of the disclosure.

The memory 620 may be a separate device independent of the processor 610 and may also be integrated into the processor 610.

In one example, the chip 600 may further include an input interface 630. The processor 610 may control the input interface 630 to communicate with the other device or chip, specifically to acquire information or data from the other device or chip.

In one example, the chip 600 may further include an output interface 640. The processor 610 may control the output interface 640 to communicate with the other device or chip, specifically to output information or data to the other device or chip.

In one example, the chip may be applied to the network device of the embodiments of the disclosure, and the chip may implement corresponding flows implemented by the network device in each method of the embodiments of the disclosure, which will not be elaborated herein for simplicity.

In one example, the chip may be applied to the mobile terminal/terminal device of the embodiments of the disclosure, and the chip may implement corresponding flows implemented by the mobile terminal/terminal device in each method of the embodiment of the disclosure, which will not be elaborated herein for simplicity.

It is to be understood that in the embodiments of the disclosure, the chip may also be referred to as a system level chip, a system chip, a chip system or an on-chip system chip.

Figure 19:
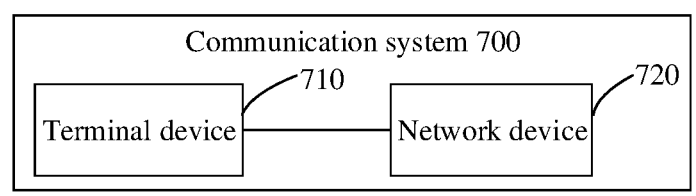
FIG. 19 is a schematic diagram of a communication system according to an embodiment of the disclosure.

FIG. 19 is a schematic block diagram of a communication system 700 according to an embodiment of the disclosure. As illustrated in FIG. 19, the communication system 700 includes a terminal device 710 and a network device 720.

The terminal device 710 may be configured to realize corresponding functions realized by the terminal device in the above method, and the network device 720 may be configured to realize corresponding functions realized by the network device in the above method. For simplicity, it will not be elaborated herein.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another Programmable Logic Device (PLD), a discrete gate or transistor logic device, and a discrete hardware component. Each method, operation and logical block diagram disclosed in the embodiments of the disclosure may be implemented or executed. The universal processor may be a microprocessor, or the processor may also be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory, and the processor reads information in the memory and completes the operations of the method in combination with hardware.

It can be understood that the memory in the embodiment of the disclosure may be a volatile memory or a non-volatile memory, or may include both the volatile and non-volatile memories. The non-volatile memory may be a ROM, a PROM, an Erasable PROM (EPROM), an EEPROM, or a flash memory. The volatile memory may be a RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

The embodiments of the disclosure also provide a computer-readable storage medium, which is configured to store a computer program.

In one example, the computer-readable storage medium may be applied to a network device in the embodiments of the disclosure, and the computer program enables a computer to execute corresponding flows implemented by the network device in each method of the embodiments of the disclosure. For simplicity, it will not be elaborated herein.

In one example, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, it will not be elaborated herein.

The embodiments of the disclosure also provide a computer program product, which includes a computer program instruction.

In one example, the computer program product may be applied to a network device in the embodiments of the disclosure, and the computer program instruction enables a computer to execute corresponding flows implemented by the network device in each method of the embodiments of the disclosure. For simplicity, it will not be elaborated herein.

In one example, the computer program product may be applied to a mobile terminal/terminal device in the embodiments of the disclosure, and the computer program instruction enables a computer to execute corresponding flows implemented by the mobile terminal/terminal device in each method of the embodiments of the disclosure. For simplicity, it will not be elaborated herein.

The embodiments of the disclosure also provide a computer program.

In one example, the computer program may be applied to a network device in the embodiments of the disclosure, and the computer program runs in a computer to enable the computer to execute corresponding flows implemented by the network device in each method of the embodiments of the disclosure. For simplicity, it will not be elaborated herein.

In one example, the computer program may be applied to a mobile terminal/terminal device in the embodiments of the disclosure, and the computer program runs in a computer to enable the computer to execute corresponding flows implemented by the mobile terminal/terminal device in each method of the embodiments of the disclosure. For simplicity, it will not be elaborated herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, apparatus and unit described above may refer to the corresponding processes in the method embodiments and will not be elaborated herein for convenient and brief description.

In some embodiments provided in the disclosure, it is to be understood that the disclosed system, apparatus, and method may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be in the same place, or may also be distributed to multiple network units. Part or all of the units may be selected to achieve the purposes of the solutions of the embodiments according to a practical requirement.

In addition, each function unit in each embodiment of the disclosure may be integrated into a processing unit, each unit may also physically exist independently, and two or more than two units may also be integrated into a unit.

When realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The above storage medium includes various media capable of storing program codes such as a U disk, a mobile hard disk, a ROM, a RAM, a magnetic disk, or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for configuring transmission resource cancelation indication information, applied to a terminal device and comprising:
   receiving configuration information from a network device, the configuration information being used for configuring transmission resource cancelation indication information and configuring a first reference time region related to the transmission resource cancelation indication information, wherein a starting point offset of the transmission resource cancelation indication information is a time interval between a transmission ending time of the transmission resource cancelation indication information and a time starting point of the first reference time region related to the transmission resource cancelation indication information;
   wherein the time starting point of the first reference time region is determined based on a last symbol of a Control Resource Set (CORESET) where the transmission resource cancelation indication information is located and the starting point offset of the transmission resource cancelation indication information, and
   information configured for each carrier to determine the starting point offset of the transmission resource cancelation indication information is determined based on a subcarrier spacing (SCS) of each carrier and information used for determining the starting point offset of the transmission resource cancelation indication information, and the information used for determining the starting point offset of the transmission resource cancelation indication information corresponds to a third SCS.

2. The method of claim 1, wherein a transmission time of the transmission resource cancelation indication information is before a starting symbol of the first reference time region.

3. The method of claim 1, wherein the first reference time regions are in one-to-one correspondence with carriers.

4. The method of claim 1, wherein a reference time region of each carrier is determined based on the SCS of each carrier and the first reference time region, and the first reference time region corresponds to a first SCS.

5. The method of claim 4, wherein the first SCS is predetermined in a protocol.

6. The method of claim 4, wherein the first SCS is a downlink SCS.

7. The method of claim 1, wherein a time length corresponding to the first reference time region is more than or equal to a period of a search space where the transmission resource cancelation indication information is located.

8. The method of claim 1, wherein first time indication granularities are in one-to-one correspondence with carriers.

9. The method of claim 1, wherein a time indication granularity of a first carrier is determined based on an SCS of the first carrier and a first time indication granularity, and the first time granularity corresponds to a second SCS.

10. The method of claim 1, wherein the third SCS is predetermined in a protocol.

11. The method of claim 1, wherein the third SCS is a maximum SCS in the SCSs of the multiple carriers.

12. The method of claim 1, wherein the configuration information is further used for configuring at least one of the following information related to the transmission resource cancelation indication information: a reference frequency region, a transmission resource cancelation indication bit number, a first time indication granularity, or information used for determining a starting point offset of the transmission resource cancelation indication information.

13. A terminal device, comprising:
   a transceiver, configured to receive configuration information from a network device, the configuration information being used for configuring transmission resource cancelation indication information and configuring a first reference time region related to the transmission resource cancelation indication information, wherein a starting point offset of the transmission resource cancelation indication information is a time interval between a transmission ending time of the transmission resource cancelation indication information and a time starting point of the first reference time region related to the transmission resource cancelation indication information;
   wherein the time starting point of the first reference time region is determined based on a last symbol of a Control Resource Set (CORESET) where the transmission resource cancelation indication information is located and the starting point offset of the transmission resource cancelation indication information, and
   information configured for each carrier to determine a starting point offset of the transmission resource cancelation indication information is determined based on a subcarrier spacing (SCS) of each carrier and information used for determining the starting point offset of the transmission resource cancelation indication information, and the information used for determining the starting point offset of the transmission resource cancelation indication information corresponds to a third SCS.

14. The terminal device of claim 13, wherein a time length corresponding to the first reference time region is more than or equal to a period of a search space where the transmission resource cancelation indication information is located.

15. The terminal device of claim 13, wherein the configuration information is further used for configuring at least one of the following information related to the transmission resource cancelation indication information: a reference frequency region, a transmission resource cancelation indication bit number, a first time indication granularity, or information used for determining a starting point offset of the transmission resource cancelation indication information.

16. A network device, comprising:
   a transceiver, configured to send configuration information to a terminal device, the configuration information being used for configuring transmission resource cancelation indication information and configuring a first reference time region related to the transmission resource cancelation indication information, wherein a starting point offset of the transmission resource cancelation indication information is a time interval between a transmission ending time of the transmission resource cancelation indication information and a time starting point of the first reference time region related to the transmission resource cancelation indication information;

wherein the time starting point of the first reference time region is determined based on a last symbol of a Control Resource Set (CORESET) where the transmission resource cancelation indication information is located and the starting point offset of the transmission resource cancelation indication information, and information configured for each carrier to determine the starting point offset of the transmission resource cancelation indication information is determined based on a subcarrier spacing (SCS) of each carrier and information used for determining the starting point offset of the transmission resource cancelation indication information, and the information used for determining the starting point offset of the transmission resource cancelation indication information corresponds to a third SCS.

17. The network device of claim 16, wherein a time length corresponding to the first reference time region is more than or equal to a period of a search space where the transmission resource cancelation indication information is located.

18. The network device of claim 16, wherein the configuration information is further used for configuring at least one of the following information related to the transmission resource cancelation indication information: a reference frequency region, a transmission resource cancelation indication bit number, a first time indication granularity, or information used for determining a starting point offset of the transmission resource cancelation indication information.

* * * * *